United States Patent [19] [11] 4,329,540
Howarth [45] May 11, 1982

[54] BLOCKING FEED-THROUGH FOR COAXIAL CABLE

[75] Inventor: Robert F. Howarth, El Cajon, Calif.

[73] Assignee: The United States of America as represented by the Secretary of the Navy, Washington, D.C.

[21] Appl. No.: 136,858

[22] Filed: Apr. 3, 1980

[51] Int. Cl.[3] .......... H01B 17/30; H02G 3/22

[52] U.S. Cl. .......... 174/153 R; 174/65 SS; 277/4

[58] Field of Search .......... 174/18, 23 R, 50.55, 174/65 R, 65 SS, 76, 77 R, 91, 93, 151, 152 R, 153 R, 35 C; 277/4, 102, 110, 112, 187; 285/158, 161

[56] References Cited

U.S. PATENT DOCUMENTS

| | | | |
|---|---|---|---|
| 1,805,155 | 5/1931 | Weeks | 285/158 X |
| 2,100,824 | 11/1937 | Wayman | 174/65 SS |
| 2,258,941 | 10/1941 | Wayman | 285/158 |
| 2,542,583 | 2/1951 | Shea, Jr. | 174/77 R X |
| 2,651,529 | 9/1953 | Wayman | 174/65 SS X |
| 2,827,509 | 3/1958 | Wayman | 174/76 X |
| 3,331,914 | 7/1967 | Kavinsky | 174/65 SS |
| 3,555,171 | 1/1971 | Larson | 277/110 X |

FOREIGN PATENT DOCUMENTS

| | | | |
|---|---|---|---|
| 200636 | 11/1958 | Austria | 174/76 |
| 740523 | 10/1943 | Fed. Rep. of Germany | 174/65 SS |
| 262532 | 12/1926 | United Kingdom | 174/93 |

OTHER PUBLICATIONS

Pamphlet: "An Application Guide for Electromagnetic Compatability", published by Chomerics, Inc., Arlington, Mass., Copyright 1969, p. 7.

*Primary Examiner*—Laramie E. Askin
*Attorney, Agent, or Firm*—Richard S. Sciascia; Ervin F. Johnston; Thomas Glenn Keough

[57] ABSTRACT

A coaxial cable is fed through a wall without introducing electrical reflections or otherwise compromising the cable's electrical integrity. A cylindrically-shaped housing having a cavity is inserted through an opening in the wall and is locked in place while an o-ring seals the juncture. A curable adhesive compound fills the cavity and adhesively engages an exposed length of cable shielding and the inner wall of the cavity. After the compound cures, a watertight interconnection and penetration of the wall is formed without compromising the cable's electrical integrity.

2 Claims, 4 Drawing Figures

BLOCKING FEED-THROUGH FOR COAXIAL CABLE

BACKGROUND OF THE INVENTION

A great number of hull penetrators and cable couplers have evolved over the years. Most resist mechanical stresses to one degree or another and some try to maintain a watertight passageway. The wide variety of designs and the many familiar structures are too numerous to discuss at length here for all contribute in their own way to the advancement of the state of the art.

Recent advances in sophisticated signal processing technology have given designers the ability to extract meaningful data from heretofore undecipherable jumbles of signals, particularly in the higher frequency ranges. Coaxial cables have long been able to transmit such information in an increasingly satisfactory manner as they are steadily improved. Transmission and processing of minute high frequency signals requires, among other things, that there be an uninterruped, uniform continuity in the coaxial carrier. Discontinuities even in the form of sharp corners, tears, constrictions and crimps etc. in the coaxial cable's shielding create unwanted electrical reflections and other attenuation consequences caused by modification of the cable's relative geometry.

Most noticeably, conventional penetrators tend to distort a coaxial cable when the cable traverses a pressured differential, such as that found at a submerged instrumentation monitor. In addition to the compensating for a pressure differential, a designer must assure that water is blocked to keep the electronics dry. Heretofore, contemporary pressure compensation and sealing schemes compromised the transmissivity of the signals. Furthermore, conventional packing gland penetrators did not block a passageway through the cable which could lead to "hosing" along at least a portion of the cable's length.

Thus, there is a continuing need in the state of the art for a pressure-compensating, sealed penetrator which does not comprise the electrical integrity and signal transmissivity of a coaxial cable.

SUMMARY OF THE INVENTION

The present invention is directed to providing an apparatus for assuring the watertight electrical integrity of a coaxial cable where it passes through an opening in a wall. A cylindrically-shaped member has a cavity with a bored size to receive the coaxial cable while a curable plastic adhesive fills the cavity for adhesively engaging the cable in the cavity after it has cured. Prior to curing, a cap receives the cable through its center and displaces the plastic adhesive to assure that there are no voids and that the cavity is filled. A lock nut and o-ring along with the cured adhesive in the cavity assure a securely sealed wall penetration.

A prime object of the invention is to provide an improved wall penetrator.

Another object is to provide a wall penetrator ideally suited for passing a coaxial cable.

A further object is to provide a coaxial cable wall penetrator that does not comprise the electrical integrity of the coaxial cable.

Yet another ojbect of the invention is to provide a coaxial cable wall penetrator which assures a nondistortive engagement of the coaxial cable.

Yet a further object is to provide a wall penetrator that is air-droppable, water immersible and adaptable for nuclear and non-nuclear warfare.

Another object is to provide a hull penetrator which eliminates leaking or hosing through an underwater cable.

Still another object is to provide a hull penetrator of reduced complexity and resultant higher reliability.

Still another object is to provide a low cost, easily installable, hull penetrator for accommodating coaxial cables.

These and other objects of the invention will become more readily apparent from the ensuing description and claims when taken with the drawings.

FIG. *2a* is a longitudinal cross-sectional depiction of the constituent elements of the invention.

FIG. *2b* is an end view of the cap member.

Figure 1:
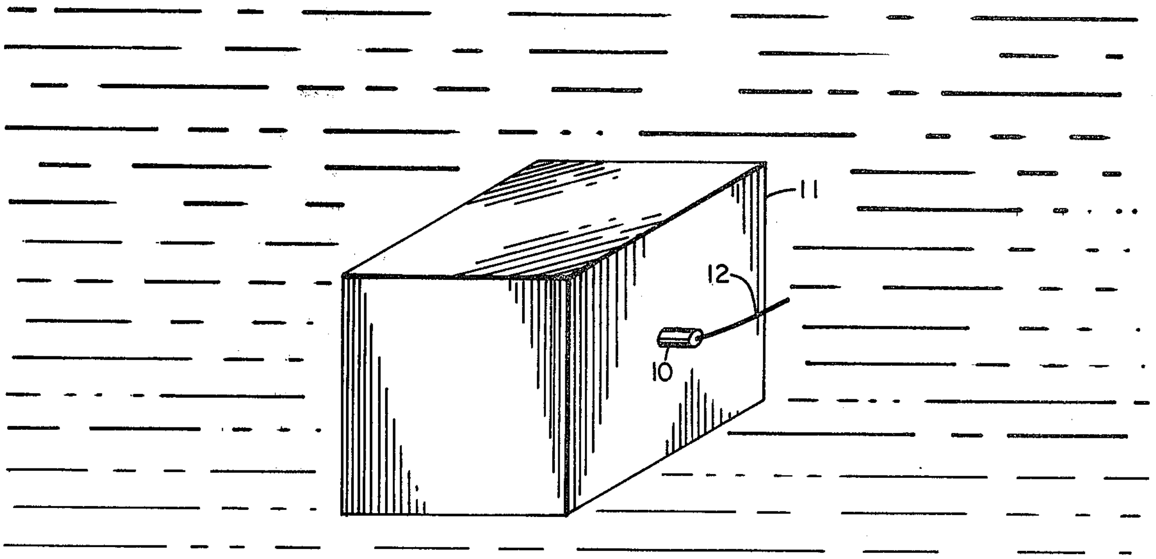
FIG. 1 depicts the invention operatively disposed on an undersea instrumentation package.
Figure 3:
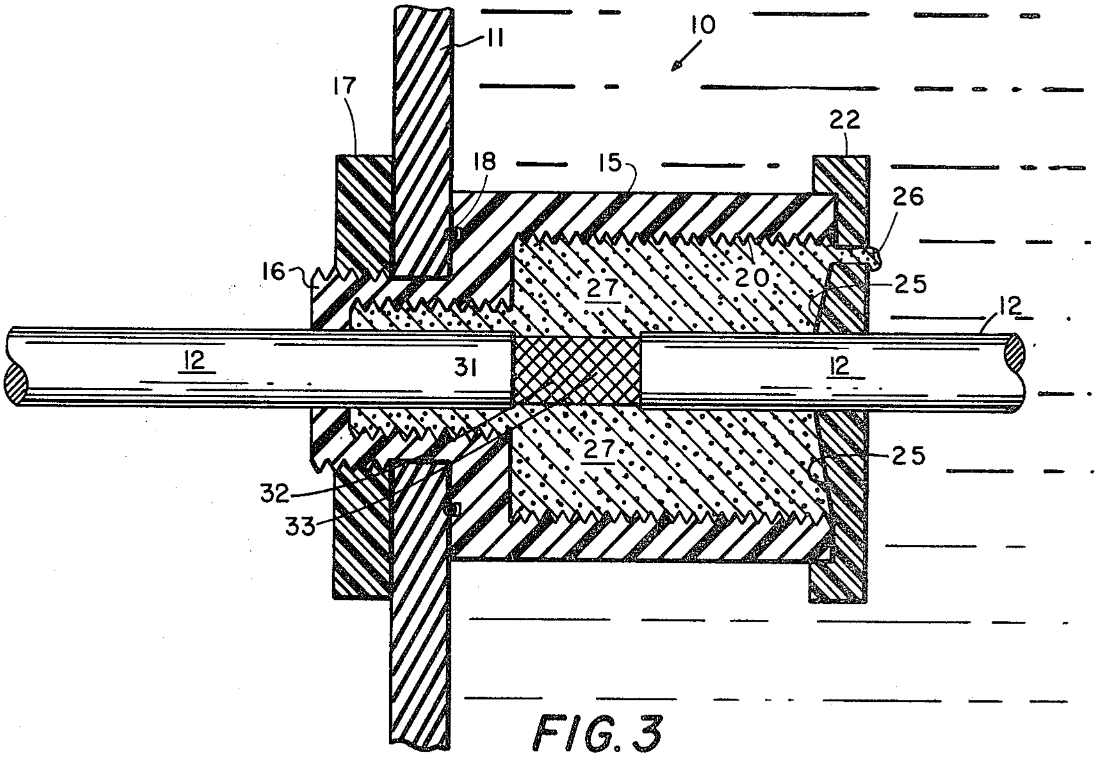
Figure 2A:
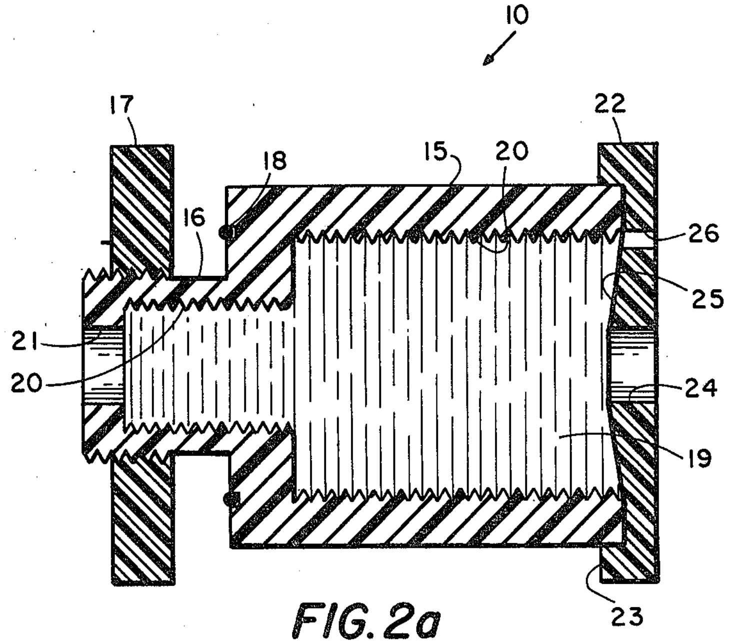
Figure 2B:
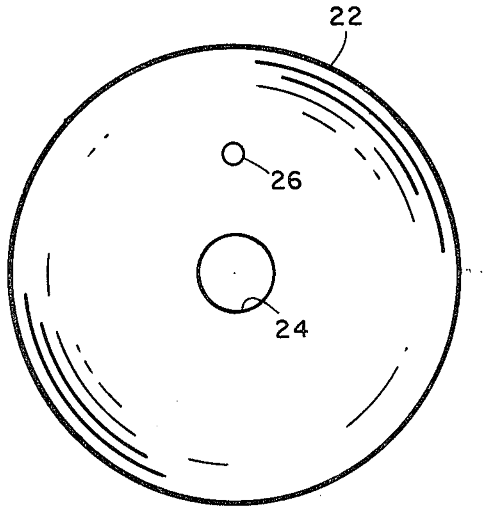

FIG. 3 is a longitudinal cross-sectional representation of the invention having a coaxial cable adherently secured in-place therein.

DESCRIPTION OF THE PREFERRED EMBODIMENT

Referring now to the drawings, a penetrator 10 provides an access to an undersea instrumentation enclosure 11 for information passing through a coaxial cable 12. Since the package can be located some distance below the surface of the water, the penetrator must function not only to assure an unimpeded transmission of signals but must also block the effects of ambient pressure as well as the consequences of leaking water. While these three design constraints do not seem to be overly formidable in a good many applications, recent technological developments have made designers aware that coaxial cables can and do reflect and otherwise alter signals (particularly at higher frequencies) when they are crimped, bent or otherwise deformed.

Heretofore such a deformation usually has been a tolerated consequence of using conventional penetrators. However, in some of the latest, sophisticated signal processing techniques, this consequence compromises the system's capabilities, for the entire spectrum of pure or otherwise unaffected signals should reach the processing circuitry for responsive analysis and action.

Referring to FIGS. *2a* and *2b* a penetrator 10 has been fashioned which does not alter the physical characteristics or relationships between a coaxial cable's shielding and its conductor. An essentially cylindrically-shaped housing 15 has an extension 16 that is shaped to fit through a hole or an opening in the wall of the instrumentation enclosure.

A lock nut 17 is suitably threaded to mate with corresponding threads provided on the outer surface of the projecting portion. Threading the lock nut on the extension and tightening it holds the penetrator in the cabinet wall. Because of an o-ring 18 mounted in an annular groove in the housing, a sealing relationship is created as the lock nut draws the housing against the wall, see FIG. 3.

The housing is provided with a longitudinal bore 19 having a number of grooves or threads 20 machined in its inner surface. A port 21 is bored through extension 16 and has a diameter to have a close fit with a coaxial cable which eventually will be inserted through the penetrator.

A cap member 22 has a lip 23 sized to fit about the circumference of the housing and, by so doing, closes the cavity. Another bore 24 is located in the cap in an aligned relationship with bore 21 and it too is sized to closely fit about a selected coaxial cable.

A portion 25 projects inwardly from the cap into the cavity when the cap is placed on the housing so that its lip 23 overlaps. A hole 26 is drilled through the cap to provide a vent for the cavity. The significance of the projecting portion and the vent hole will be more appreciated as the cap is placed in its closing relationship on the cavity.

The last constituent of the penetrator is a viscous adhesive or potting compound 27. Many of a host of acrylic resins or epoxy compounds are suitable so long as they have the properties of being plastic and fluid long enough in the uncured state to fill the cavity with no or few voids and cure to a hardened mass which adheres to the machined inner surface 20 of the housing and a coaxial cable 12 which fits through bores 21 and 24, note FIG. 3.

The coaxial cable is shown in place with a portion of its outer jacket 31 removed to expose the cable's shielding 32 and dielectric filler 33. Removal of the jacket allows the designer to secure the cable to the penetrator without introducing any crimping or other deformation. The plastic adhesive compound 27 contacts and infiltrates the shielding and dielectric to secure the cable to the housing after the adhesive compound cures. This complete bonding also defeats any "hosing" problem.

The penetrator is easily installed by a technician or marine scientist. Cable 12 is inserted through the penetrator and a portion of outer jacket 31 is removed. The plastic adhesive compound 27 fills cavity 19 and contacts machined inner surface 20 as well as the exposed shielding 32 and dielectric filler 33. Cap 22 is fitted on the housing with the cable extending through bore 24 so that projecting portion 25 is pushed back into the cavity to displace some of the plastic adhesive compound 27. Because the cap covers the cavity, the displaced adhesive compound is extruded through hole 26 as are any air pockets or voids that might otherwise have been trapped in the penetrator interior.

After the curing period for the adhesive compound passes, the integral penetrator is inserted through a hole in instrumentation package 11 and lock nut 17 is tightened to draw the housing closer to the wall and compress o-ring 18 which sealably conforms to the surface of the wall about the opening.

All of the elements described above are nonmetallic or made of materials so as to avoid creating any unnecessary electromagnetic interference; however, all should be designed to be of sufficient strength to withstand the tensile and torsional stresses expected in the harsh marine environment as well as the constant effects of pressure and corrosion. The parts can be fashioned by casting, machining, whittling, etc. so long as the structural demands required of the penetrator are met.

Obviously, many modifications and variations of the present invention are possible in the light of the above teachings, and, it is therefore understood that within the scope of the disclosed inventive concept, the invention may be practiced otherwise than as specifically described.

What is claimed is:

1. The combination of a wall provided with an opening therethrough, a coaxial cable extending through the opening, and apparatus assuring secure watertight integrity of said coaxial cable where it passes through said opening in said wall;

said coaxial cable comprising a center conductor, a dielectric filler coaxially disposed about the conductor, a cable shielding coaxially disposed about the filler and an outer jacket coaxially disposed about the shielding, the coaxial cable having a portion of its outer jacket removed to expose its shielding;

a housing having a portion extending through said opening and having a longitudinally extending cavity provided with inwardly extending, ridge-like protuberances in the lateral surfaces and having a bore receiving said coaxial cable therethrough, the coaxial cable being positioned to locate the exposed shielding within the cavity;

means substantially filling the cavity for adhesively engaging the protuberances and surfaces defining the cavity, the outer surface of said coaxial cable and the exposed shielding and having a plastic property prior to curing, and a rigid hardened property after curing, the adhesively engaging means holding and securing the coaxial cable without exerting compressive stresses; and a cap on said housing, said cap being provided with a port to allow the escape of excess adhesively engaging means and any gas bubbles, a bore aligned with the housing bore and receiving said coaxial cable therethrough and further provided with a projection extending into said cavity to assure the displacement of the adhesively engaging means while plastic, to rid it of voids and to cause the adhesively engaging means to completely fill the cavity, thereby assuring secure watertight electrical integrity by the adhering engagement of the shielding with the adhesively engaging means and preventing hosing.

2. The combination according to claim 1 further including:

means mounted on the housing for securing it to the wall and means carried on the housing for sealably conforming to a surface of the wall about the opening when the securing means is tightened.

* * * * *